(12) United States Patent
Papa et al.

(10) Patent No.: US 10,602,459 B2
(45) Date of Patent: Mar. 24, 2020

(54) BASE STATION POWER MANAGEMENT USING SOLAR PANEL AND BATTERY FORECASTING

(71) Applicant: Parallel Wireless, Inc., Nashua, NH (US)

(72) Inventors: Steven Paul Papa, Windham, NH (US); Prashanth Rao, Wilmington, MA (US); Yang Cao, Westford, MA (US); Rajesh Kumar Mishra, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/293,461

(22) Filed: Mar. 5, 2019

(65) Prior Publication Data

US 2019/0274105 A1  Sep. 5, 2019

Related U.S. Application Data

(60) Provisional application No. 62/638,887, filed on Mar. 5, 2018.

(51) Int. Cl.
*H04W 52/34* (2009.01)
*H04W 52/02* (2009.01)
(Continued)

(52) U.S. Cl.
CPC ....... *H04W 52/34* (2013.01); *H04W 52/0206* (2013.01); *H04W 52/28* (2013.01);
(Continued)

(58) Field of Classification Search
CPC . H04W 52/0206; H04W 52/34; H04W 84/18; H04W 88/08
See application file for complete search history.

(56) References Cited

U.S. PATENT DOCUMENTS 8,600,572 B2  12/2013  Sri-Jayantha
2009/0207787 A1  8/2009  Sato et al.
(Continued)

FOREIGN PATENT DOCUMENTS

CN  103439572 A  12/2013
CN  205265350 U  5/2016

*Primary Examiner* — Keith Ferguson
(74) *Attorney, Agent, or Firm* — Michael Y. Saji; David W. Rouille (57) ABSTRACT

A system is disclosed, comprising: a solar panel; an electric power supply source; a wireless fronthaul access point coupled to a radio mast and in communication with a remote baseband unit, the wireless fronthaul access point further comprising a first millimeter wave wireless interface; a self-organizing network module in communication with a coordinating server; and an antenna-integrated radio for providing access to user equipments (UEs), mounted within line of sight on the radio mast with the wireless fronthaul access point, the antenna-integrated radio further comprising: a second millimeter wave wireless interface configured to receive the digital I and Q signaling information from the remote baseband unit wirelessly via the wireless fronthaul access point, wherein the wireless fronthaul access point thereby wirelessly couples the remote baseband unit and the antenna-integrated radio. Synchronization is used to pack used resource blocks to reduce the duty cycle of the PAs, thereby reducing power.

18 Claims, 5 Drawing Sheets

(51) Int. Cl.
  *H04W 52/54* (2009.01)
  *H04W 52/28* (2009.01)
  *H04W 88/08* (2009.01)
  *H04W 84/18* (2009.01)

(52) U.S. Cl.
  CPC ............ *H04W 52/54* (2013.01); *H04W 84/18* (2013.01); *H04W 88/08* (2013.01)

(56) References Cited

U.S. PATENT DOCUMENTS

| | | | | |
|---|---|---|---|---|
| 2011/0077059 | A1* | 3/2011 | Kim | H04W 52/0274 |
| | | | | 455/574 |
| 2011/0276269 | A1 | 11/2011 | Hummel | |
| 2012/0165063 | A1* | 6/2012 | Scalia | H04W 52/343 |
| | | | | 455/522 |
| 2012/0302295 | A1* | 11/2012 | Bishop | H04L 41/147 |
| | | | | 455/574 |
| 2012/0329471 | A1* | 12/2012 | Barta | H04W 24/02 |
| | | | | 455/452.1 |
| 2015/0009839 | A1* | 1/2015 | Shikama | H04W 52/243 |
| | | | | 370/252 |
| 2017/0104449 | A1 | 4/2017 | Drees | |

\* cited by examiner

BASE STATION POWER MANAGEMENT USING SOLAR PANEL AND BATTERY FORECASTING

CROSS-REFERENCE TO RELATED APPLICATIONS

This application claims priority under 35 U.S.C. § 119(e) to U.S. Provisional Pat. App. No. 62/638,887, entitled "Base Station Power Management Using Solar Panel And Battery Forecasting" and filed Mar. 5, 2019, and hereby incorporates by reference U.S. Pat. No. 9,578,605, "Adjusting Transmit Power Across a Network," filed Sep. 29, 2014; U.S. Pat. No. 9,654,168, "Antenna-Integrated Radio with Wireless Fronthaul," filed Sep. 12, 2016; U.S. Pat. App Pub. No. US20150098387A1, "Parameter Optimization and Event Prediction Based on Cell Heuristics," filed Oct. 8, 2014; U.S. Pat. App Pub. No. US20160135132A1, "Self-Calibrating and Self-Adjusting Network," filed Nov. 9, 2015, each in its entirety, having U.S. Pat. No. 9,654,168, "Antenna-Integrated Radio With Wireless Fronthaul", filed Sep. 12, 2016. This application also hereby incorporates by reference, for all purposes, each of the following publications in their entirety for all purposes: U.S. Pat. App. Pub. Nos. US20140133456A1, US20150094114A1, US20150098385A1, US20150098387A1, US20160044531A1, US20170013513A1, US20170019375A1, US20170026845A1, US20170048710A1, US20170055186A1, US20170064621A1, US20170070436A1, US20170077979A1, US20170111482A1, US20170127409A1, US20170171828A1, US20170181119A1, US20170202006A1, US20170208560A1, US20170238278A1, US20170257133A1, US20170272330A1, US20170273134A1, US20170288813A1, US20170295510A1, US20170303163A1, US20170347307A1, US20180123950A1, and US20180152865A1; and U.S. Pat. Nos. 8,867,418, 8,879,416, 9,107,092, 9,113,352, 9,232,547, and 9,455,959.

BACKGROUND

Currently, antenna-integrated radios exist. These are devices that integrate antennas with remote radio heads (RRHs). A remote radio head includes power amplifiers (PAs), filters, antennas, and a digital interface. Radio signals are received at the antenna, translated into digital format at the integrated RRH, and sent over a Common Public Radio Interface (CPRI) interface to a baseband unit located separate from the antenna-integrated radio.

Also, cellular sites may be powered by solar panels. The electronics may also be physically located in a cabinet or structure located at the base of the tower. Solar panels do not provide consistent power, and cell sites typically require a connection to the power grid.

DETAILED DESCRIPTION

Coming generations of the LTE standard are proposed that will increase the number of radios on a tower. An increase in the number of radios permits multi-band, multi-radio access technology (multi-RAT) flexibility and performance, and provides opportunities to perform beamforming, coordinated multi-point (CoMP) inter-cell interference cancellation (ICIC), and other technologies. However, more radios mean more power required. A need exists to provide power management and off-grid power, typically solar, that can flexibly and interoperably handle a variety of power conditions.

Figure 1:
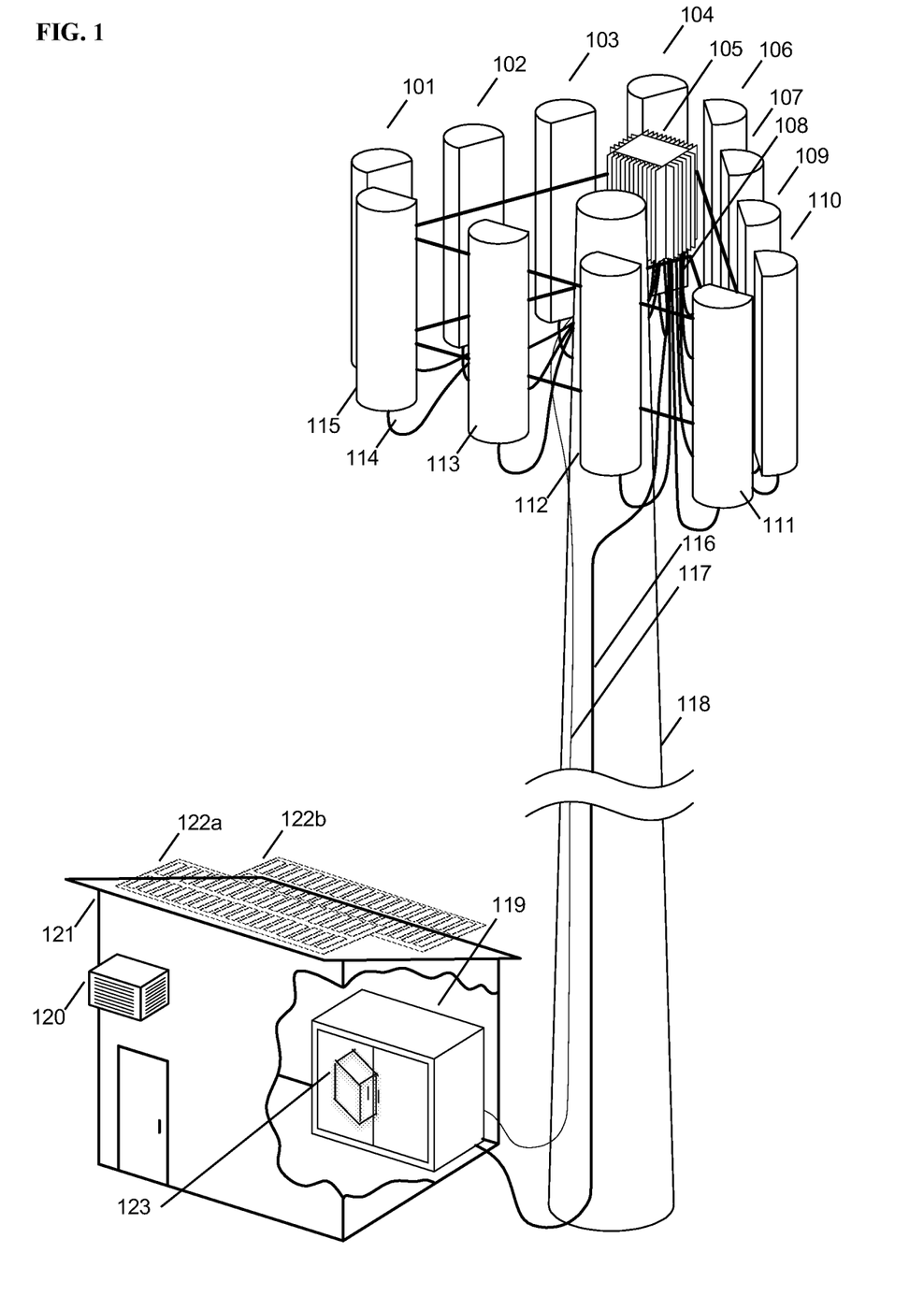
FIG. 1 is a schematic diagram of a radio architecture utilizing a remote radio head and solar panels, in accordance with some embodiments.

FIG. 1 depicts another example of a current-generation base station radio architecture, using remote radio head architecture. In the figure, a cabinet 119 includes a baseband unit. The cabinet is also inside a shelter 121, which also includes appropriately sized air conditioning 120 to cool the baseband in the cabinet and provide substantial air conditioning. The baseband in the cabinet has a fiber optic output connection 117 using the common public radio interface (CPRI) protocol and small form factor pluggable (SFP) connectors to fiber. The baseband also has a power output 116 to deliver power for the remote radio head. CPRI fiber extends up the pole or mast 118 to the radio head 105 (although the point of connection is not shown), which is on the tower but not at the antenna. The radio head 105 has a CPRI interface to the baseband unit, and has RF cable connections to each of the twelve antennas 101, 102, 103, 104, 106, 107, 109, 110, 111, 112, 113, 115. The antennas are arranged in the figure as four antennas for each of three sectors. The radio head takes the output of the CPRI interface, which is digital, turns it into an analog radio frequency signal, amplifies it through a PA, and performs filtering through a filter, before sending it through radio frequency cables to each antenna; all the RF cables exit as shown at cable bundle 108, and connect to the antennas; for example, RF cable 114 connects RRH 105 to antenna 115. Less air conditioning is needed, as the radio head is air cooled. However, the radio frequency cables have significant RF signal loss of at least 0.5 dB. The shelter 121 has solar panels 122a and 122b mounted on its roof. The solar panels 121a and 122b generates electrical power needed for the operation and management of the antenna site that may include power needed for cooling, power needed by the power amplifiers, antennas, and other system components installed on the mast. The PAs consume the majority of the power (this is understood to be typical at 8-12 W RF typical—assume 3-4× energy input—they typically cover 500 Mhz wide band. Accordingly, being able to power down even for milliseconds can save a lot of energy. Also, a standby battery 123 to supply electrical power may be installed inside the cabinet 119. The standby battery 123 may provide required electrical power during cloudy weather when the solar panels may not produce sufficient electrical power.

In some embodiments, filters may include, for example, cavity filters, or ceramic filters. Filters may be made of cast aluminum (in particular for cavity filters), or from ceramic. Filters may be combined for multiple bands of operation. Filters may be of varying sizes for handling radio bands with different wavelengths. The power amplifiers (PAs) consume the majority of the electrical power needed at the antenna site. In general, for an about 8 to 12 W of RF output for 500 MHz bandwidth, the power amplifiers need energy input that is approximately 3 to 4 times the output power. The power output or power consumption of the power amplifiers and the filters as well as the duty cycle for each filter may be considered when creating or evaluating power usage profiles. In some embodiments, each radio head is configured to include an antenna, software-defined radio (SDR), filter, and PA or low noise amplifier (LNA) for a single channel of a multi-channel MIMO configuration. Using the example of a 2×2 MIMO installation, each radio head provides a "half-RRH" or "single-channel RRH," with its output remotely controlled by the baseband unit. MIMO installations have not traditionally split signals from a single MIMO configuration across devices. The reason is that processing of antenna signals needs to be performed together. Greater coordination and synchronization among the baseband units enables this, in some embodiments. Specifically, higher degrees of synchronization, up to and including 1 part per billion of synchronization, are combined with rapid processing and high-bandwidth wireless links to enable separate, coordinated processing of the individual RRH signals. Methods for synchronization include IEEE 1588 compliant time sources, as well as the methods described in U.S. Pat. No. 9,048,979, hereby incorporated by reference in its entirety.

A new approach is suggested to ameliorate these problems. Power flexibility is made possible using the disclosed approach. One or more of the following components may be combined to create an improved base station: a solar energy module; a battery module; and a power management software module.

A power management system for a wireless fronthaul access point is also proposed. A multi-sector base station tower is typically configured with radio heads mounted in a triangular configuration. By placing a wireless fronthaul access point in the center of the triangle, the base station can be located very close to the RRHs, i.e., within line of sight or in some cases within approximately 5 meters. This proximity allows the use of high-bandwidth radio technologies, such as Wi-Gig, to provide multi-gigabit (5-10 Gbps) bandwidth to each radio head, to take the place of CPRI and provide fronthaul for all I and Q signals going into and coming out of the antennas.

In further embodiments, a method is disclosed for power profile management at a base station and a coordinating server. The coordinating server may be in communication with a plurality of base stations. The method may include one or more of the following steps, which may be implemented either at the base station or the coordinating server as appropriate: assess power profile of base station; find/determine optimizations to reduce power profile of the base station; and sending the optimizations as instructions to the base station. The optimizations may further include: grouping RBs to reduce transmit duty cycle; reducing load by moving UEs to other nearby base stations; turning off RATs if appropriate (time of day, # active users, historical usage, or other factors as described herein, including predictive factors); and reducing range, for example, if all connected UEs are not using the network much, drop to a reduced range 4G cell but provide coverage using another RAT (2G or 3G as available). The optimizations may be sent to a plurality of base stations and the determination of optimizations may be done in connection with a single base station, a plurality of base stations, a subset of base stations in a network managed by a coordinating server, a subset of base stations being in a neighbor relationship with each other, or based on any other arbitrary configuration or list of base stations as determined by the network operator. The power optimizations may be saved in power profiles. Power profiles may be assigned to be changed at predetermined intervals or times. Power profiles and optimizations may be determined instantaneously or in an offline process over a period of time. The base stations may be configured to follow the instructions of a coordinating server, or to override instructions from the coordinating server based on needs happening at the base station in real time. Any operational parameter of a base station could be changed using an optimization or a power profile. Steps of this method can be integrated with any or all of the other features described in the description herein.

Figure 2:
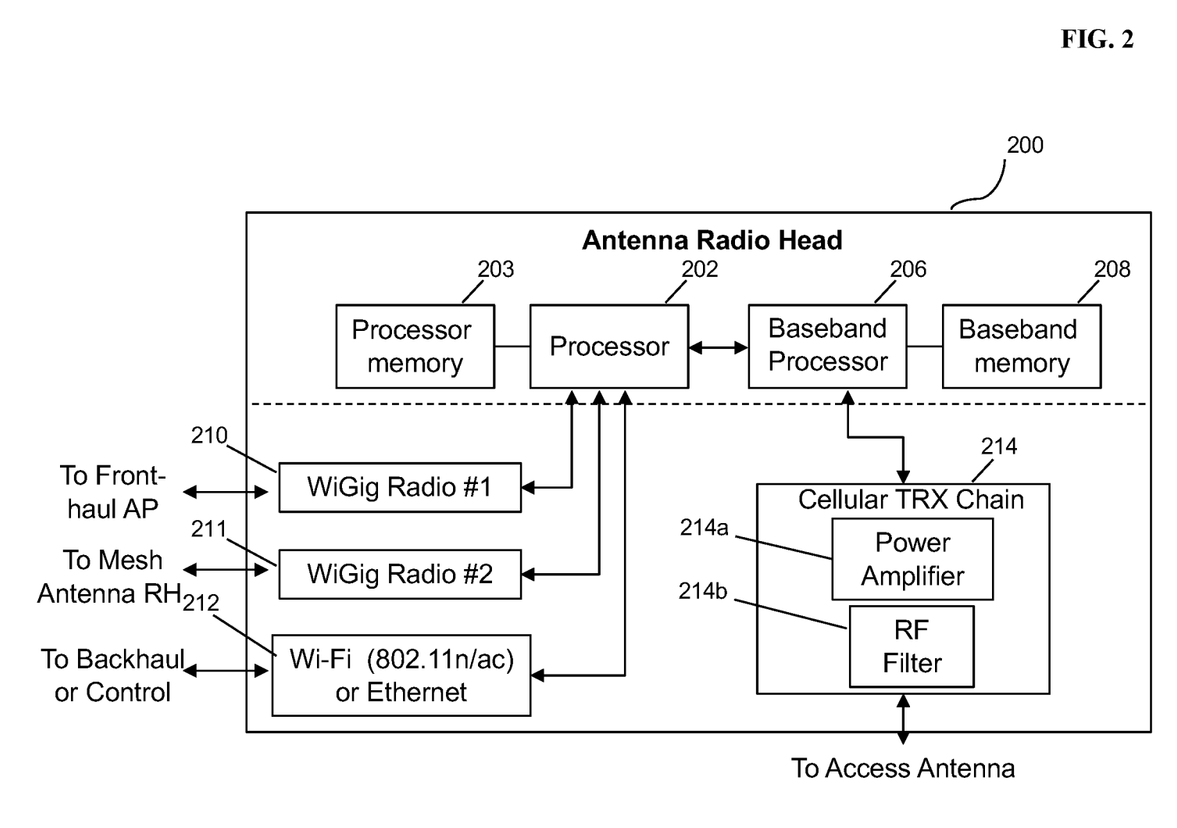
FIG. 2 is a schematic diagram of an antenna-integrated radio with wireless fronthaul capability utilizing solar panels, in accordance with some embodiments.

In some embodiments, a base station or wireless fronthaul access point may include self-organizing network (SON) module and a power management module or functionality or solution as described here. The base station or wireless fronthaul access point using self-organizing network module may harmonize with a coordinating server or an application server in the mobile operator's core network. The SON module/functionality may incorporate any combination of features disclosed in the documents incorporated previously by reference herein, including the ability to operationally configure any operational parameter of the base station or access point. The coordinating server may include a power management module or functionality. In some embodiments, the power management module may exist at the coordinating server only, at an application server only, or located at some combination of the coordinating server and the application server. In some embodiments, the power management module and/or SON module may be processes executed on processor 202.

Standby battery voltage and charge status information may be communicated and used to determine availability of power, in embodiments that utilize battery backup. The coordinating sever may further compare the tentative electrical power produced by the solar panels and the batteries based on the present and forecasted weather condition to the total power needed for the operation based on the number of users being served, power needed for fronthaul access, backhaul access, radios, antennas, power amplifiers, filters, etc., in order to adjust the amount and source of the electrical power needed for operation. Power management may be provided for base stations connected to the power grid, as well, in some embodiments, in the same manner as discussed throughout this disclosure.

In some embodiments, the coordinating server or other node may create a power usage profile for the antenna site based on one or more of the factors identified herein to determine power needs at the site. In some embodiments, the coordinating server or the application server may create a power management profile or power usage profile. In some embodiments, the power management profile or power usage profile may be constructed at the base station. It is noted that a large number of configuration parameters and usage parameters of the base station are available at a coordinating server or application server. The coordinating server may be a Parallel Wireless HetNet Gateway, as further described in US20140133456A1 and other documents that have been incorporated by reference herein. The coordinating server may also have access to information from a plurality of base stations across the radio access network, and may also have access to specific UE measurement reports that are forwarded by the base stations via or to the coordinating server.

The power usage profile may associate electrical power needed with factors that may impact the required electrical power; the factors may be network backhaul conditions, type of traffic, number of users being served, number of antennas, type of filters, number of power amplifiers, power, any power loss, weather conditions affecting desired range of service, weather conditions affecting generation of power by the solar panels, standby or storage battery status and voltage condition, time of the day, day of the year, number of users on each radio access technology (RAT), data rate for each connected user, duty cycle, utilization of radio resources, processor resources, network resources, backhaul resources, etc., as well as any operational factors described herein or described in any of the documents incorporated by reference herein.

The power usage profile may be a predictive power usage profile. One or more predictive power usage profiles may be used, based on the use of predictive functions for predicting load or usage at various times in the future as described in US20160135132. The predictive power usage profile may be used to determine power usage at a specific moment in the future. Predictive power usage profiles may be compared with future predicted power availability to assess whether corrective action is needed or likely to be needed at a future time. In some embodiments, the predictive factors described in U.S. Pat. App. Pub. No. US20160135132 may be used.

The power management module may access current or future weather conditions through direct weather feed, via an Internet-based weather feed, or through user-fed weather data, and may calculate the electrical power output of the solar panels installed at the antenna site based on the received weather conditions to determine availability of power via the solar panels. The solar panel availability of power may be used in conjunction with the power usage profile to calculate the amount and source of the additional electrical power needed. The availability of power may be stored as a power availability profile. Different sources of electrical power may be individually considered, and power from different sources may be used differently or according to a prioritization scheme.

The power management module may communicate, for example, using an XML-based interface with the wireless fronthaul access point and exchange information about operational parameters such as power requirements by the modules for supporting: backhaul functionality, fronthaul functionality, number of users being serviced for access to the core network, and processors and other system components, site information, e.g., solar panel information, to calculate the power profile, including static configuration by the network operator. In some embodiments, the coordinating server may use the power usage profile to perform analysis to determine whether sufficient power will be available, and to determine appropriate methods of adjustment for electrical power at the antenna site to reduce power needed, or to maintain the power envelope based on one or more of the factors identified herein. In some embodiments, an X2 protocol may be used to transfer power profiles among base stations directly.

In some embodiments, power generated from different sources, such as the solar panel, may be reserved for only some components and may affect how the power adjustment may be performed by the power management module. For example, battery power may be reserved for the processing systems and not for the radio, or vice versa. In some embodiments, the power management module may predict or generate charts suggesting power requirement needs and adjustments required to meet power needs based on past power consumption history, time of the day, and day of the year, and current weather forecast, standby battery condition and level. In some embodiments, the power management module may update the power management profile, when the trend of data received at the power management module from the wireless fronthaul access point indicates a shift from previously collected data patterns. The power management module may update the power management profile either with each data collected or periodically or based on user commands.

In some embodiments, wireless radios may be integrated into the antennas for short-distance inter-antenna communication. The radios may operate at a high frequency, such as millimeter-wave or 60 GHz, and may be WiGig, 802.11ad, or other wireless radios; these radios will be referred to as WiGig radios in this disclosure. At high frequencies such as used by these radios, high data rates are possible, sufficient to handle the digital data demands for digital fronthaul traffic, with minimal interference to the reception and transmission frequencies of the radios. The wireless range limitations of frequency bands in the tens of gigahertz (i.e., microwave or millimeter wave) are not problematic, as the antennas are co-located/mounted on the same radio tower. Moreover, the WiGig radios can replace two RF cables and 4 connectors, significantly mitigating power loss. The antennas may thus be feederless, using wireless for the "last inch" of fronthaul. The bandwidth required for a wireless fronthaul interface depends on the backhaul bandwidth needed for connected user devices. A typical LTE frequency band requires either 10 or 20 MHz of bandwidth. When multiple-in, multiple-out (MIMO) technologies are used, the bandwidth required for 10 MHz ranges from 1.2 Gbps for 10 MHz, 2×2 MIMO to 9.8 Gbps for 20 MHz, 8×2, 8×4, 8×8 MIMO. WiGig currently supports 7 Gbps, enabling fronthaul for all but the 20 MHz 8×8 MIMO case, and future wireless technologies using higher-rate radios may also be incorporated to support such cases. The fronthaul connection may also accommodate MIMO, ICIC, DPD, and other digital processing scenarios. The fronthaul connection may also accommodate compression of the raw digital signal, in some scenarios, such as lossless I/Q compression or frequency domain compression. In some embodiments, the use of wireless fronthaul ensures that each antenna requires only power to be physically connected. A physical docking system may be used that provides power and additional features, such as orientation configurability, while only requiring an antenna system to be dropped in with a small degree of force to connect to power, such as the docking system described in U.S. Pat. No. 9,654,168, hereby incorporated by reference in its entirety.

In some embodiments, instead of using a single fronthaul WiGig access point for the central WiGig controller, one wireless fronthaul integrated antenna may act as a master, and other integrated antennas may act as slaves. In some embodiments, a resilient master-slave architecture may be used such that another antenna may automatically provide failover for a base station. In some embodiments, one master antenna may have multiple slaves. In some embodiments, backhaul may also be wireless. A lower-bandwidth wireless interface may be used, including another WiGig interface or a Wi-Fi interface. Backhaul to one antenna may be shared with other antennas, in a mesh network. In some embodiments, when the only required physical interface is power, installation and maintenance are significantly improved.

Current methods for troubleshooting errors when a remote data connection is unavailable entail a technician climbing the tower to reach the errant antenna. When the antenna is significantly less expensive, the entire antenna module may simply be replaced. In some embodiments, a replacement antenna may be installed via drone, or using a less-expensive technician to connect power.

Unlike with other remote radio head solutions, in some embodiments, an entire baseband board may be placed inside each antenna. In the case of a MIMO antenna, which is configured to be used as one of multiple antennas, the baseband board may be enabled to handle the input and output streams for that specific antenna. One power amplifier may be located in each antenna as well. The WiGig radio may be used as fronthaul, replacing a fiber connection. Heat dissipation may be improved by leveraging of the antenna thermal mass. Low-bandwidth digital signals are input into the antenna, high-bandwidth digital fronthaul is avoided or is transmitted over high-bandwidth digital wireless signals, and RF signal loss is reduced, along with power consumption. The combined unit may be manufactured at scale for significantly reduced cost. In some embodiments, small cell systems on a chip (SOCs) may be used to drive a small form factor baseband board colocated with an antenna. The baseband board may have the processing power to provide wireless access to users on a wireless access network. Multiple such baseband-integrated antennas may be combined to provide multi-sector wireless access service.

As the physical enclosure requires only power and/or a wired Ethernet port, the RF connector machining requirements may be relaxed, and the cost of the enclosure itself may be reduced. The enclosure may be a simple block of cast metal, large enough for a single filter appropriate for any frequency band. Minimal holes may be machined. A radio-transparent section may provide egress for radio frequency signals. The radio-transparent section may be configured on the tops and the bottoms of the enclosure, such that the antennas provide visibility to all other antenna modules on the tower, as well as the wireless backhaul connection antenna. Although WiGig signals do not penetrate ice and snow, the thermal dissipation from the antenna module, particularly in the transparent region, is anticipated to result in melting of such snow or ice.

In some embodiments, filters may include, for example, cavity filters, or ceramic filters. Filters may be made of cast aluminum (in particular for cavity filters), or from ceramic. Filters may be combined for multiple bands of operation. Filters may be of varying sizes for handling radio bands with different wavelengths. The power amplifiers consume the majority of the electrical power needed at the antenna site. In general, for an about 8 to 12 W of RF output for 500 MHz bandwidth, the power amplifiers need energy input that is approximately 3 to 4 times the output power.

In some embodiments, reducing dB loss by 0.5 can result in a 10% reduction in power amplifier power output, which can save 10% of the energy consumption budget of the PA. In some embodiments, [if the power amplifiers can be turned off even for a few milliseconds, it may result in a substantial savings in the energy.] This power savings can be canceled out by the power consumption of the baseband unit. However, as the power is consumed at both the baseband board and the power amplifier, cooling requirements are still improved over the use of a highly power-consuming power amplifier. Another difference in heat generation is that the power amplifiers, which used to be centralized across multiple antennas within a single baseband unit, are not spread out over multiple antennas. This also improves cooling requirements. Total reduction of thermal mass is 10-20%. In some other embodiments, [scheduling algorithms may be tailored to pack resource blocks into contiguous time with as much time between successive resource blocks that power amplifiers can be powered down for energy efficient operation.] In some embodiments, time, frequency and phase synchronization techniques may be employed for determining power down schedule of the power amplifier for energy efficient operation.

[Typically, 8 to 12 W RF power requires 3 to 4 times of the energy input for a typical 500 MHz wide radio frequency band. If broadcast over this 500 MHz frequency band can be stopped even for few milliseconds, it may result in a lot of energy saving. Therefore, managing the scheduler to pack resource blocks into contiguous time with as much time between them has a lot of value as it saves a lot of energy. This may be achieved by synchronizing with other radio transmission devices such as VSAT or other base stations, and thereby able to power down power amplifiers and saving a lot of energy without adverse effect. An ability to power down power amplifiers for a small duration by proper scheduling and synchronizing, would result in reduced energy input requirements, and need of reduced size of solar panels and/or backup batteries. This approach is also applicable while MIMO antenna or WiGig radio are used. Source synchronization with accuracy of 1 ppb may help to minimize guard bands for a MPTP transmissions.

An additional benefit of locating the power amplifier in the antenna is increased power amplifier resiliency. Even if one power amplifier fails, its failure is contained to the particular antenna it is located in. This is in contrast to traditional installations, where power amplifier failures can cascade. Power amplifiers typically fail due to overheating. When they are contained together within a single cabinet, more than one of them may fail at once due to heat-related issues or lightning. This likelihood is reduced when the PAs are physically separated.

Another benefit is electrical isolation. Using wireless fronthaul removes the need to connect antennas and other components using low-impedance RF cable, thereby providing near-complete electrical isolation. This has a side benefit of reducing complexity by eliminating the need for electrical isolators between each component, and this reduction in complexity allows operators to more easily troubleshoot and maintain the equipment.

Without tower amplification and RF loss, sensitivity is improved on the receive side. No significant cabinet being needed, rooftop installation is simplified. Multiple bands may be enabled using multiple antenna modules, each mounted to a single antenna or single tower. The tower need only provide adequate space for RF filters of the appropriate frequency band.

FIG. 2 shows the components that would be used in such a device. Integrated antenna radio head 200 includes the following components. A processor 202 is connected to a processor memory 203, which may be used together to perform operations described herein. Processor 202 is connected to a first WiGig radio 210, which is connected to a fronthaul AP (not shown) via WiGig at a high data rate, and to the processor 202. Processor 202 is also connected to a second WiGig radio 211, which is connected to another radio head via another WiGig connection. Processor 202 is also connected to a backhaul connection 212, which may be an 802.11n/ac connection or an Ethernet connection. The WiGig radios provide their own on-chip antennas, in some embodiments. Processor 202 may provide routing or switching between interfaces 210, 211, and 212 and may receive digital I and Q data from the backhaul connection or the WiGig fronthaul and may send the digital I/Q to the baseband processor. A baseband processor 206 may be connected to the processor 202 and to a baseband memory 208. The baseband processor 206 is connected to the cellular transmit/receive (TRX) chain 214 of the antenna radio head, which includes power amplifier 214a and RF filter 214b for transmission, as well as other RF functions, such as a duplexer for processing received RF signals. The cellular TRX chain receives analog RF I and Q from the baseband processor 206 and outputs it to the access antenna (not shown).

An IEEE 802.11n Wi-Fi radio may be used to provide additional backhaul support, with or without Ethernet backhaul. A baseband board may be provided to perform all baseband functions specific to this antenna. The baseband board may include DPD and CFR functions, as well as self-test routines and modules, as well as handling for one or more channels of MIMO, or one or more channels of multiple radio access technologies, e.g., 2G, 3G, 4G, 5G, UMTS, LTE, and the like. A system-on-chip may be used for any combination of these components. The enclosure may include two WiGig radios. One of the WiGig radios may connect to a wireless fronthaul access point (AP) located at the center of the mast. As the WiGig antennas have limited range, it is useful that the fronthaul AP is located within line of sight and within a short distance away, for all antennas on the mast. In some embodiments, one WiGig radio may connect to another antenna on the base station; in other embodiments, an additional WiGig antenna may be provided for redundancy. The enclosure may also include a power amplifier and a filter, and the physical antenna component. The power amplifier could be a 30 W power amplifier, in some embodiments. The enclosure needs only to have power, and optionally wired Ethernet. With a traditional enclosure, the holes require careful drilling that is different for each application. Here, as the enclosure thus has fewer holes, it is more reproducible and less expensive to produce, as well as having fewer holes for water ingress.

Figure 3:
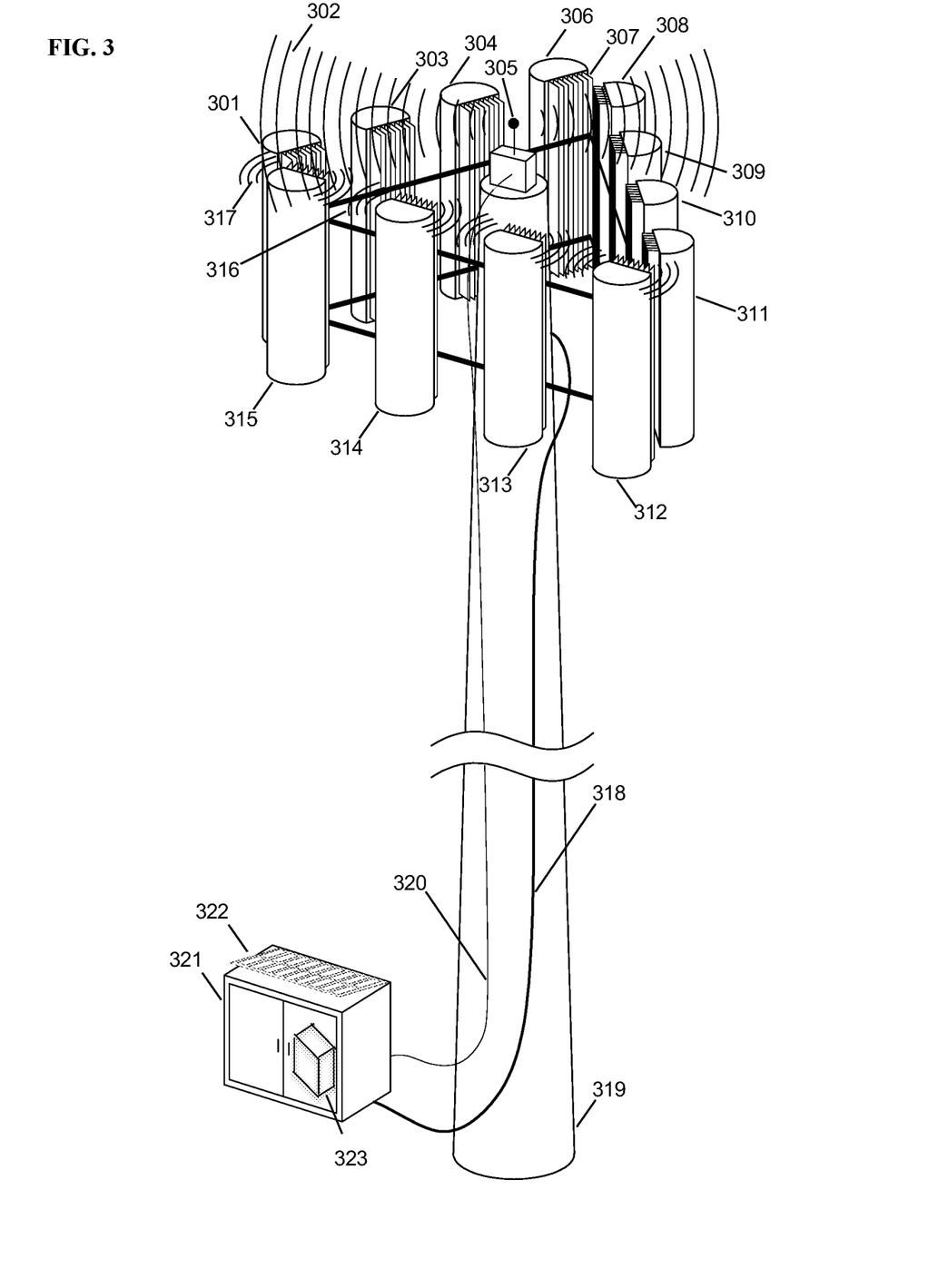
FIG. 3 is a schematic diagram of a radio architecture utilizing wireless fronthaul, in accordance with some embodiments.

FIG. 3 shows a system including the embodiment of FIG. 2. At the top of mast 319, wireless fronthaul access point 305 is provided at the top of a mast 319 and fed by fiber 320 for backhaul, and power (not shown). Power is also carried up the mast by a cable 318 and is distributed by a power distribution system built into the mast and connected to each antenna; ordinary 48 V DC power may also be provided to each of the antennas. Antennas 301, 303, 304, 306, 308, 309, 310, 311, 312, 313, 314, 315 are fed digital I and Q signals wirelessly by the fronthaul AP 305, which wireless signal is shown as 302; they point outward to provide access and they each have WiGig antennas pointed toward the fronthaul AP. The rear of antenna 306 shows exemplary heat dissipation fins 307, which, together with the thermal mass of the antennas, is enough to dissipate heat passively. Antennas 314 and 315 communicate in a WiGig daisy chain with antennas, as shown by wireless signals 316 and 317. The wireless fronthaul access point 305 may include a self-organizing network module (not shown) to communicate and harmonize with a coordinating server (not shown) or an application server (not shown).

WiGig is used between each of the four antennas to provide fronthaul. Wi-Fi (802.11ac, in the 5 GHz band) is used for backhaul from each of the antennas. The only physical connection at the antenna may be power, in some embodiments, or Ethernet and power. No RF cable loss is entailed. No tower amplifier, combiner or splitter is required on or around the tower.

At the bottom of the mast, cabinet 321 no longer needs a shelter with air conditioning, as the reduction in power wastage and increase in thermal mass enables passive cooling at the cabinet. Therefore, no AC and no baseband unit are found at the cabinet; instead, only a passively cooled power supply and a backhaul network terminal are provided in the cabinet. The standby battery 323 may also be located inside the cabinet 321. Also shown are solar panels 322.

Figure 4:
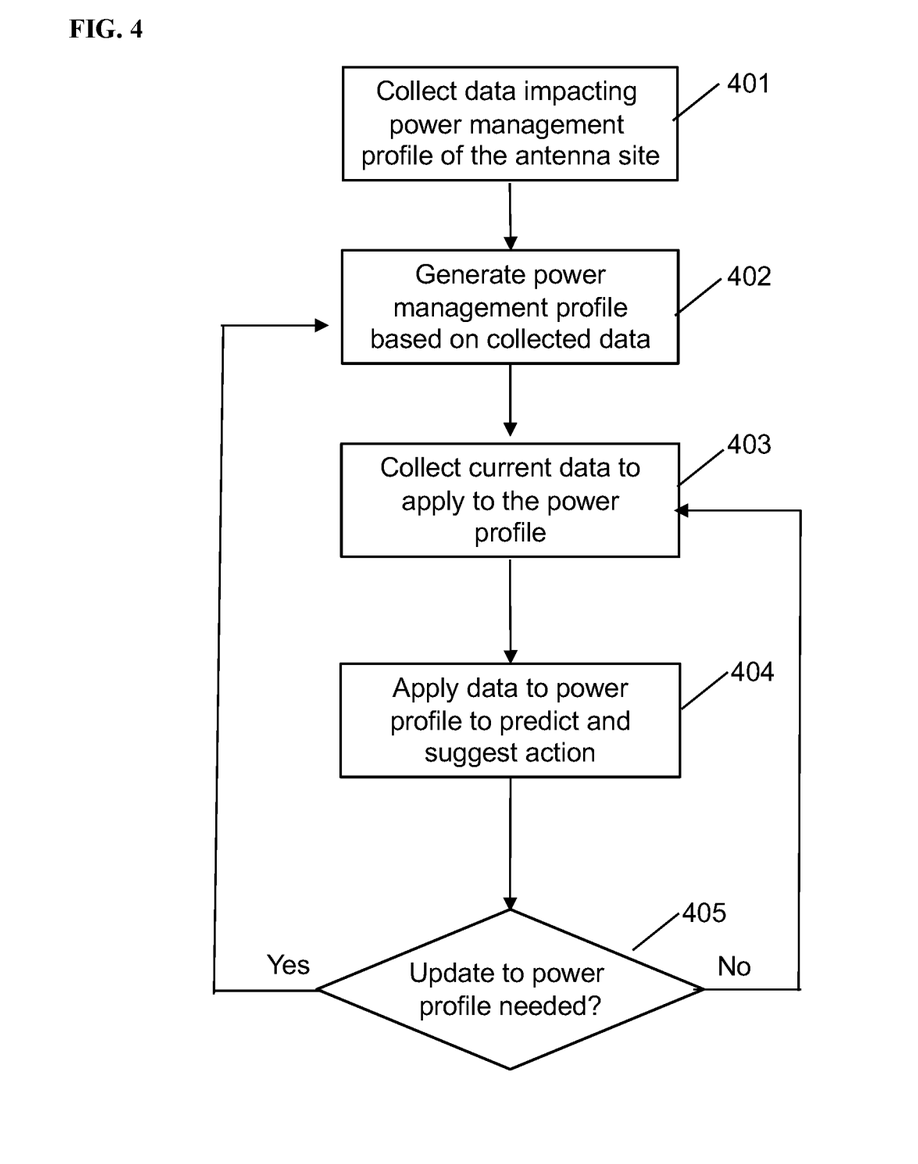
FIG. 4 is a flowchart depicting steps of a power management process, in accordance with some embodiments.

FIG. 4 shows a flowchart of a power management process, in accordance with some embodiments. The power management process may be performed at a power management module, or at another location, as disclosed elsewhere herein. As shown at step 401, various data that may impact the consumption of power at the antenna site is collected either at the coordinating server or the application server in the mobile operator's core network. The data that may impact the consumption of power at the antenna site is intended to include, but is not limited to, number of users serviced by the wireless fronthaul access point and other macro base station or cell stations causing interference; broadcast schedules based on time, phase, and frequency synchronization with other base stations; current weather patterns, as radio signal propagation may be affected by the weather and hence effective coverage area to service mobile subscribers; a number of solar panels installed and the output electrical energy of the solar panel; and available battery power, in addition to the factors identified above or anywhere elsewhere herein.

At step 402, a power management profile for the specific antenna site is generated based on analysis of the collected data at step 401. The generated power management profile may characterize required power at the particular antenna site against weather conditions, in some embodiments creating additional sub-profiles per weather condition. The power management profile may also characterize power requirement based on number of users served and range of desired coverage area, in some embodiments creating additional sub-profiles per desired number and/or range value. The power management profile may also generate a schedule of power availability from sources such as solar panels, standby battery, and off-grid power supply, based on factors described above.

Once the power management profile is generated for the antenna site, the coordinating server or the application server may enter into a loop to receive and apply current data to select an appropriate power management profile as shown at step 403. At step 404, the application server or the coordinating server may apply the received current data from the wireless fronthaul access point and may generate prediction and may also generate instructions to the wireless fronthaul access point to take actions, e.g., change a power amplifier's on/off schedule, increase/decrease transmit power, update a source of power such as solar panels versus standby battery, etc., or to schedule such actions in the future. At step 405, if the received current data at step 403 requires an update to power management profile, the power management profile may be updated. Otherwise, current data may be again collected periodically to continue corrections as required.

For example, the antenna site operator may choose to use the wireless fronthaul access point described above with radio heads mounted in a triangular configuration. The wireless fronthaul access point's placement in the center of the triangle, with approximate distance of 5 meters away gives benefit of use of high-bandwidth radio technologies and thereby providing higher data rate and speed. The operator may install solar panels to support energy need using solar energy. The operator may also install battery backup. Steps 401 and 402 may be performed to create an initial power management profile. If weather conditions cause the solar panels to produce less power than initially anticipated by the operator, this condition may be identified at step 403 and the battery backup may be selected to provide alternate power at step 404. If battery backup becomes insufficient, for example, due to a prolonged period without solar power, this condition may be detected at a later date at step 403, and the power management module may direct that one of the three radio heads be turned off at step 404 to reduce power consumption.

The wireless fronthaul access point equipped with self-organizing network module may communicate with the coordinating server or the application server in the mobile operator's core network. The coordinating server or the application server may be running a special algorithm to serve the purpose of electrical power management at the antenna site. Therefore, the coordinating server or the application server may use a XML-interface defining messaging between the wireless fronthaul access point. Using the messaging interface, the coordinating server may collect data needed to create a power management profile and may send instructions to the wireless fronthaul access point to take actions based on applications of the collected data to the power management profile.

Figure 5:
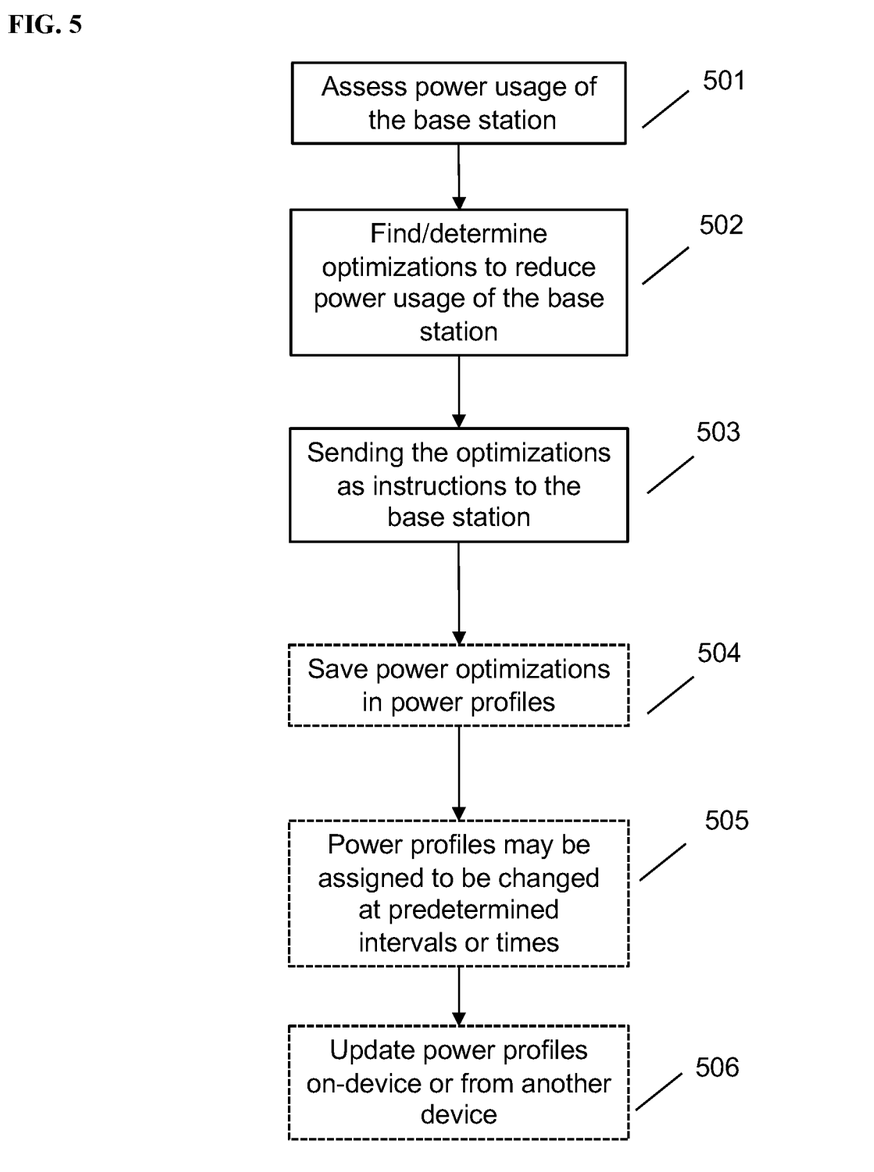
FIG. 5 is a further flowchart depicting steps of a power management process, in accordance with some embodiments.

FIG. 5 is a further flowchart regarding a power management process, in accordance with some embodiments. At step 501, power usage of the base station is assessed. The assessment may involve the base station, a coordinating server, or both in conjunction. The assessment may entail one or more of adding up known power usage, multiplying with factors based on configuration and status and load of the base station, multiplication of factors against a preconfigured standard value, etc. At step 502, once the power usage is known, and once the configuration of the base station is known, optimizations may be determined to reduce the power usage of the base station. The optimization may be determined at the base station, at the coordinating server, or both. At step 503, the optimizations may be sent as instructions to the base station from the configuration server. At step 504, optionally, the optimization may be saved in power profiles. Power profiles may be preconfigured on the device, in some embodiments. Power profiles may be changed or reconfigured by the base station subject to the instructions. Saved power optimizations may be reflected using named power profiles, e.g., solar only, battery backup, connected to main power, high power, conserve power, etc. At step 505, optionally, power profiles may be assigned to be changed at predetermined intervals or times, for example, when the sun goes down and battery backup is required, or at certain times of day when load increases on the base station and more power is needed. At step 506, optionally, the power profiles stored on the device may be updated on the device.

The user may consider factors that may impact the electrical power usage at the site. Such factors may be number of users serviced by the wireless fronthaul access point, distance from other wireless base stations, power consumption by individual components such as power amplifiers, base stations, processors, and other system components. The user may also consider factors like traditional weather pattern in the region, number of solar panels and power generated by solar panels, standby power supply and its current capacity and condition. The operator may also consider any scheduling algorithm that may relax the need to keep the power amplifiers on continuously.

Further factors concerning power consumption may include: how many MIMO legs are being used for each connected UE; QAM, modulation, or coding being used for nearby UEs; QAM, modulation, or coding being used for faraway UEs; cells turned on, cells turned off; RATs turned on, RATs turned off; UE measurements, including CQI, for power control.

Once the user has collected data impacting the power consumption at the antenna site, power management profile may be created that may be able to predict the energy requirement, and also plan budgeting of the power required based on variables like current weather, number of users, time of the day, day of the week, effect of scheduling algorithms, and so on. The user may also be able calculate number of solar panels needed to produce electrical energy needed based on weather patterns. The user may also be able to schedule power amplifier's on/off schedule based on the numbers of users served and other access stations in the cell area. While the collection of current data to apply to the power management profile is continuous or periodically as specified by the site operator or operator of core or radio access network, when the collected data indicates that power management profile needs to be updated based on changes in the data that not only are outside of previously observed pattern, but also inapplicable as to generate correct predictions and instructions for the power management.

In some embodiments, a power tilt antenna chassis may be provided. In some embodiments, a winch that can lower itself and that causes the antenna to guide itself into position when it is raised can be deployed at the tower in a base or cradle for the antenna module. A drone may operate an electric latch to release an antenna module, and the antenna module may lower itself to the ground using the winch. In some embodiments, a boom and trolley may be attached at the center of a tower for attaching and detaching antenna modules. The antenna chassis and/or base may be physically designed to be self-guiding, such that a new antenna may be inserted into the base by a drone or by an operator.

In some embodiments, wireless synchronization may be used between antennas. Synchronization is important for various applications, such as time division duplexing (TDD) for certain cellular bands. Direct wireless synchronization could be provided, for example using a method such as described as in U.S. Pat. No. 9,048,979. Alternatively, each antenna subsystem may be equipped with its own GPS antenna, and the GPS antennas may be used to sync the antennas together down to approximately 50 parts per billion (ppb).

In some embodiments the industrial, scientific and medical (ISM) unlicensed radio band may be used, for wireless sync, wireless fronthaul, wireless backhaul, mesh networking, daisy-chaining, or another purpose. In some embodiments a high-bandwidth high-frequency band, such as 60+ GHz, could be used.

In some embodiments, different electrical energy transfer methods may be used. For example, a packet energy transfer protocol, such as VoltServer, or Power over Ethernet, may be used to distribute power over a wired Ethernet port to each antenna module, with no electrician needed for installation. VoltServer provides a certain amount of energy in short time slices that are akin to digital packets. VoltServer also carries data as well as energy in each packet. Using the data, VoltServer also monitors the impedance on the circuit so that power can be cut rapidly with any change in impedance. As the individual energy pulses do not contain a hazardous level of energy, VoltServer provides an alternative to high-voltage wires that pose danger to people. An energy transfer system may use high-impedance cables, such as the Ethernet cables used by VoltServer. These high-impedance cables provide electrical isolation and thereby reduce the risk of electrical failure. The data connection provided by VoltServer may be used instead of or in conjunction with wireless fronthaul, in some embodiments.

In some embodiments, the baseband boards integrated into the antennas may have sufficient processing power to perform digital pre-distortion (DPD) and/or crest factor reduction (CFR).

In some embodiments, alternative fronthaul may be employed in conjunction with, or in place of, the WiGig interfaces described above. In some embodiments, a small form factor-pluggable (SFP) patch cable fronthaul may be used, either in conjunction with or in place of the WiGig wireless fronthaul connection. An appropriate number of SFP connections may be used, if substituting for the WiGig fronthaul. Patch cables may be used without the use of SFP connectors. Fiber may be used for fronthaul between the antennas. Fiber may be laid as a backup to a dedicated baseband cabinet, using, for example, the CPRI protocol, and a software decision may be made whether to use the L2/L3 interface at the baseband cabinet or at the antennas. Enhancements for CoMP may be provided such that antenna modules may provide CoMP, or CoMP may be provided based on the level of fronthaul capacity available, e.g., if a higher-bandwidth CPRI fiber fronthaul connection is available, or if higher-bandwidth wireless fronthaul is available, a gradient of CoMP enhancements may be made available.

In some embodiments, the antenna components may be deliverable by drone and may use a zero-insertion force (ZIF) connector.

In some embodiments, the dock may include antenna tilt control. In some embodiments, the tilt control may involve a wired or wireless connector.

In some embodiments, the antenna may support a physically-wired connection.

In some embodiments, the antennas can wirelessly daisy-chain with each other, enabling increased resiliency and robustness. In some embodiments, the antennas can form a mesh network.

In some embodiments, the antennas may be configured with a Wi-Gig antenna module on the back of the cellular band antenna, such that the wireless fronthaul access point is located in a non-obstructed location for all antennas. The Wi-Gig antenna module or other gigabit wireless module may be part of the antenna on a chip in a baseband board, and may be covered by a radio-transparent radome or shield, made, for example, out of plastic. Where a heat-dissipating enclosure is used, the Wi-Gig antenna or gigabit wireless module may be physically located on the exterior of the enclosure, in some embodiments. In some embodiments, where the Wi-Gig or gigabit wireless module is located on the exterior of the enclosure and not on a baseband card, the Wi-Gig or gigabit wireless module may be physically coupled to the baseband card via a standard serial digital interface.

In some embodiments, two or more wireless fronthaul access points may be provided for additional resiliency, each located in the same location within the triangle of the tower mount.

In some embodiments, a single wireless access point may be used, and may be located, for example, in the middle of the tower between all the antennas, with each antenna receiving wireless fronthaul or wireless backhaul, or both. This may enable reduction of cost of providing all the processing power to each antenna. In some embodiments a single antenna may bear the bulk of the processing burden, and may be daisy-chained to the other antennas.

In some embodiments, the wireless fronthaul access point may have an omnidirectional antenna, or a directional antenna.

In some embodiments, multiple bands, or wireless frequencies, may be supported by each antenna and/or by the wireless fronthaul access point.

In some embodiments, the wireless fronthaul link may be a Wi-Gig link or a Li-Fi link or another type of high-bandwidth wireless link. In some embodiments, the wireless link may carry an I signal, a Q signal, and management data. Multiple bands of I and Q signals may be carried. Management data may include alarms, notifications, tilt management, and other features. In some embodiments, sync data may be carried. In other embodiments, sync data may be achieved using analysis of the wireless signals already being transmitted, such as described in U.S. Pat. No. 9,048,979, hereby incorporated herein in its entirety.

In some embodiments, alternative thermal management solutions may be provided. For example, surface mount piezoelectric cooling jet technology, such as is provided by General Electric, may be applied to increase cooling capacity without the use of air conditioning.

In some embodiments, a radio resource scheduler at the base station is configured to perform scheduling in communication with the power management module. The scheduler may be given instructions, according to a power management profile or otherwise, to pack resource blocks into contiguous time with as much time between them, thereby reducing the duty cycle of the radio transmitter. Given the high quality synchronization, it is possible to pack used resource blocks to reduce the duty cycle of the PAs, resulting in a concomitant reduction of power. In some embodiments, the scheduler may be in communication with a satellite ground station, such as a VSAT. A VSAT is a two-way satellite ground station with a dish antenna that is smaller than 3.8 meters. A VSAT is a satellite modem used to establish data transfers using a communications satellite as a relay. A satellite modem's main function is to transform an input bitstream to a radio signal and vice versa. VSATs access satellites in geosynchronous orbit or geostationary orbit to relay data from small remote Earth stations (terminals) to other terminals (in mesh topology) or master Earth station "hubs" (in star topology). VSATs are used to transmit narrowband data (e.g., point-of-sale transactions using credit cards, polling or RFID data, or SCADA), or broadband data (for the provision of satellite Internet access to remote locations, VoIP or video). VSATs are also used for transportable, on-the-move (utilizing phased array antennas) or mobile maritime communications. The scheduler may perform scheduling taking into account a perfect sync to a Very Small Aperture Terminal (VSAT) (for example by way of a sync-area-network whether wireless or otherwise) and the VSAT can thus much more intelligently power down the PA.

In some embodiments, a power envelope of the entire system is calculated, including the radio, the baseband, all baseline electrical needs, electricity required to power the solar, etc. In some embodiments, one could calculate the power envelope is calculated based on past power level. These calculations of power envelope could be incorporated into a multiplier factor, or into a decision tree, along with the weather forecast and battery condition and battery level. The output of the decision tree would be taken into account by SON when assessing whether to increase or decrease power level. SON could be used to manage power usage and battery usage across multiple base stations at the configuration server.

Although the methods above are described as separate embodiments, one of skill in the art would understand that it would be possible and desirable to combine several of the above methods into a single embodiment, or to combine disparate methods into a single embodiment. For example, all of the above methods could be combined, or, for example, the power management functionality described herein could be applied to typical base stations. In the scenarios where multiple embodiments are described, the methods could be combined in sequential order, in various orders as necessary.

Although certain of the above systems and methods are described in reference to base stations for the Long Term Evolution (LTE) standard, one of skill in the art would understand that these systems and methods could be adapted for use with other wireless standards or versions thereof. In particular, the inventors contemplate the use of the disclosed systems and methods with multi-radio access technology (multi-RAT) base stations, including ones supporting 2G and 3G, 2G and 4G, 3G and 4G, 4G and 5G, Wi-Fi, or any combination of 2G/3G/4G/5G/Wi-Fi or the like.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure.

We claim:

1. A base station power management system comprising:
    a wireless fronthaul access point in communication with a remote baseband unit, the wireless fronthaul access point further comprising a first millimeter wave wireless interface; and
    a self-organizing network module in communication with a coordinating server and an antenna-integrated radio for providing access to user equipments (UEs), disposed proximate the wireless fronthaul access point, the antenna-integrated radio further comprising: a second millimeter wave wireless interface configured to receive the digital I and Q signaling information from the remote baseband unit wirelessly via the wireless fronthaul access point, wherein the wireless fronthaul access point thereby wirelessly couples the remote baseband unit and the antenna-integrated radio.

2. The base station power management system of claim 1 further comprising a power source in communication with the wireless fronthaul access point.

3. The base station power management system of claim 1 wherein the power source comprises at least one of a power supply, a standby battery and at least one solar panel.

4. The base station power management system of claim 1 wherein the wireless fronthaul access point uses Wi-Gig radio access technology for providing fronthaul.

5. The base station power management system of claim 1 wherein the wireless fronthaul access point further comprises a Self Organizing Network (SON), the SON in communication with at least one of a coordination server and an application server.

6. The base station power management system of claim 1 wherein the coordinating server collects data needed to create a power management profile and sends instructions to the wireless fronthaul access point to take actions based on applications of the collected data to the power management profile.

7. The base station power management system of claim 1 wherein a user considers factors that impact the electrical power usage, the factors including at least one of: a number of users serviced by the wireless fronthaul access point; distance from other wireless base stations; power consumption by individual components including power amplifiers, base stations, processors, and other system components; traditional weather pattern in the region; number of solar panels and power generated by solar panels, standby power supply and its current capacity and condition; and a scheduling algorithm that relaxes a need to keep the power amplifiers on continuously.

8. The base station power management system of claim 1 wherein a power management profile is created to predict energy requirements and budgeting of power, the power management profile based on variables including at least one of: current weather; number of users; time of the day; day of the week; effect of scheduling algorithms; and a number of solar panels needed to produce electrical energy needed based on weather pattern.

9. The base station power management system of claim 1 wherein a user schedules a power amplifier's on/off schedule based on the numbers of users served and other access stations in the cell area.

10. The base station power management system of claim 1 wherein when collected data indicates that the power management profile needs to be updated based on changes in the data that are outside of previously observed pattern, and data that is inapplicable to generate correct predictions and instructions for the power management.

11. The base station power management system of claim 1 wherein synchronization is used to pack used resource blocks to reduce the duty cycle of the PAs, thereby reducing power.

12. A method for managing base station power, comprising:
    collecting data impacting power management profile for an antenna site;
    generating a power management profile based on the collected data;
    collecting current data to apply to the power management profile;
    applying data to the power management profile and suggesting an action; and
    determining whether an update to the power management profile is needed, wherein determining whether an update to the power management profile is needed further comprises updating when collected data indicates that the power management profile needs to be updated based on changes in the data that are outside of previously observed pattern, and data that is inapplicable to generate correct predictions and instructions.

13. The method of claim 12 wherein when an update to the power management profile is needed then repeating the steps of:
    generating a power management profile based on the collected data;
    collecting current data to apply to the power management profile; and
    applying data to the power management profile and suggesting an action.

14. The method of claim 12 wherein when an update to the power management profile is not needed then repeating the steps of:
    collecting current data to apply to the power management profile; and applying data to the power management profile and suggesting an action.

15. The method of claim 12 further comprising a user considering factors that impact the electrical power usage, the factors including at least one of: a number of users serviced by a wireless fronthaul access point; distance from other wireless base stations; power consumption by individual components including power amplifiers, base stations, processors, and other system components; traditional weather pattern in the region; number of solar panels and power generated by solar panels, standby power supply and its current capacity and condition; and a scheduling algorithm that relaxes a need to keep the power amplifiers on continuously.

16. The method of claim 12 wherein the generating a power management profile is based on variables including at least one of: current weather; number of users; time of the day; day of the week; effect of scheduling algorithms; and a number of solar panels needed to produce electrical energy needed based on weather pattern.

17. The method of claim 12 the generating a power management profile further comprises scheduling a power amplifier's on/off schedule based on the numbers of users served and other access stations in the cell area.

18. The method of claim 12 further comprising packing used resource blocks to reduce a duty cycle of the PAs to reduce power.

* * * * *